United States Patent
Walker et al.

(10) Patent No.: US 10,705,625 B2
(45) Date of Patent: Jul. 7, 2020

(54) SYSTEM AND METHOD FOR NAVIGATION IN A USER INTERFACE

(75) Inventors: Mark Leroy Walker, Castaic, CA (US); Christopher Stephen Burns, Burbank, CA (US)

(73) Assignee: INTERDIGITAL MADISON PATENT HOLDINGS, Paris (FR)

( * ) Notice: Subject to any disclaimer, the term of this patent is extended or adjusted under 35 U.S.C. 154(b) by 540 days.

(21) Appl. No.: 13/876,377

(22) PCT Filed: Sep. 30, 2011

(86) PCT No.: PCT/US2011/054115
§ 371 (c)(1),
(2), (4) Date: Mar. 27, 2013

(87) PCT Pub. No.: WO2012/044877
PCT Pub. Date: Apr. 5, 2012

(65) Prior Publication Data
US 2013/0191788 A1   Jul. 25, 2013

Related U.S. Application Data

(60) Provisional application No. 61/388,975, filed on Oct. 1, 2010.

(51) Int. Cl.
*G06F 3/0346* (2013.01)
*G06F 3/0484* (2013.01)
(Continued)

(52) U.S. Cl.
CPC .......... *G06F 3/0346* (2013.01); *G06F 3/0236* (2013.01); *G06F 3/04812* (2013.01);
(Continued)

(58) Field of Classification Search
None
See application file for complete search history.

(56) References Cited

U.S. PATENT DOCUMENTS

| | | | |
|---|---|---|---|
| 6,292,179 | B1 | 9/2001 | Lee |
| 6,614,455 | B1 | 9/2003 | Cuijpers |

(Continued)

FOREIGN PATENT DOCUMENTS

| | | |
|---|---|---|
| CN | 1936808 | 3/2007 |
| CN | 101566910 | 10/2009 |

(Continued)

OTHER PUBLICATIONS

International Search Report dated Feb. 22, 2012.

*Primary Examiner* — Tuan S Nguyen
(74) *Attorney, Agent, or Firm* — Brian J. Dorini, Esquire; Robert D. Shedd, Esquire (57) ABSTRACT

The disclosed methods and systems are related to a navigation of user interfaces that is vector based. Vector based navigation combines the efficiency of orthogonal direction navigation (up/down/left/right) with the flexibility of pointer-based (e.g. mouse/touch-pad) navigation. User interface elements can be arranged arbitrarily in 2D (or 3D) space and described in term of vector relationships from the currently active UI element. Directional gestures coming from control devices such as a track-ball, touch-pad, or gyroscopic remote can be translated into vector movements to affect navigation between UI elements.

14 Claims, 9 Drawing Sheets

(51) Int. Cl.
*H04N 21/422* (2011.01)
*G06F 3/0481* (2013.01)
*G06F 3/023* (2006.01)
*G06F 3/0489* (2013.01)
*G06F 3/0488* (2013.01)

(52) U.S. Cl.
CPC ...... *G06F 3/04842* (2013.01); *G06F 3/04883* (2013.01); *G06F 3/04886* (2013.01); *G06F 3/04892* (2013.01); *H04N 21/42214* (2013.01); *H04N 21/42222* (2013.01); *H04N 21/42224* (2013.01)

(56) References Cited

U.S. PATENT DOCUMENTS

| | | |
|---|---|---|
| 2003/0106057 A1 | 6/2003 | Perdon |
| 2004/0119744 A1 | 6/2004 | Chan |
| 2006/0168548 A1 | 7/2006 | Kelley |
| 2006/0232551 A1* | 10/2006 | Matta ............................ 345/156 |
| 2007/0061749 A1* | 3/2007 | de Souza ............. G06F 3/0481 715/767 |
| 2008/0104058 A1 | 5/2008 | Billmaier et al. |
| 2009/0037813 A1 | 2/2009 | Newman et al. |
| 2009/0072992 A1 | 3/2009 | Yun |
| 2009/0138823 A1* | 5/2009 | Bradea ................ G06F 3/04817 715/835 |
| 2010/0023862 A1 | 1/2010 | Tai et al. |
| 2011/0055743 A1 | 3/2011 | Miyazaki |
| 2011/0074790 A1* | 3/2011 | Fenn ................... G06F 3/04886 345/467 |

FOREIGN PATENT DOCUMENTS

| | | |
|---|---|---|
| EP | 2083350 | 7/2009 |
| JP | 05298023 | 12/1993 |
| JP | 08314637 | 11/1996 |
| JP | 2003510926 | 3/2003 |
| JP | 201154049 | 3/2011 |
| JP | 2011154543 | 8/2011 |
| KR | 1020010080610 | 8/2001 |
| WO | WO0123991 | 4/2001 |
| WO | WO02059737 | 8/2002 |
| WO | WO2009128148 | 10/2009 |

* cited by examiner

Relationship of elements described as vector

SYSTEM AND METHOD FOR NAVIGATION IN A USER INTERFACE

CROSS REFERENCE TO RELATED APPLICATIONS

This application claims the benefit, under 35 U.S.C. § 365 of International Application PCTIUS11/54115, filed Sep. 30, 2011, which was published in accordance with PCT Article 21(2) on Apr. 5, 2012 in English and which claims the benefit of U.S. provisional patent application No. 60/388, 975, filed Oct. 1, 2010.

BACKGROUND

Technical Field

This invention relates to the field of user interfaces. More particularly, this invention relates to the navigation of user interfaces designed for orthogonal (Up/Down/Left/Right) navigation using pointer-based remotes.

Description of Related Art

Existing user interface navigation schemes, such as for TV User Interfaces, utilize D-Pad (Directional Pad) input or, more recently, pointer-based navigation using gyro or other types of remote controls. The D-pad input restricts design of the user interface to support horizontal and/or vertical navigation sometimes resulting in inefficient navigation. The pointer-based navigation removes the restriction of user interface element placement but forces the UI to use an indicator, such as an arrow or pointer, to traverse the screen real-estate to highlight the desired item—this may result in traversing empty screen area which can also be inefficient.

SUMMARY

The disclosed embodiments are related to a system and method for user navigation and more specifically to a method and system of navigation that is vector based. Vector based navigation combines the efficiency of orthogonal direction navigation (up/down/left/right) with the flexibility of pointer-based (e.g. mouse/touch-pad) navigation. User interface elements can be arranged arbitrarily in 2D (or 3D) space and described in terms of vector relationships from the currently active UI element. Directional gestures coming from control devices such as a track-ball, touch-pad, or gyroscopic remote can be translated into vector movements to affect navigation between UI elements.

In accordance with one aspect a method is provided for navigating a user interface. The method involves expressing the orientation of at least one element of the user interface and at least one neighbor as vector information, receiving movement information input for navigating the user interface, translating the movement information into vector information, and mapping the vector information translated from the received movement information to the vector information expressing the orientation of the at least one element and at least one neighbor.

In accordance with another embodiment a system is provided allowing for the navigation of a user interface. The system includes an electronic device. The electronic device includes an output interface, an input interface, a processor, and storage. The output interface is configured to output a user interface. The input interface is configured to receive movement information for navigating the user interface. The processor configured to express the orientation of at least element of the user interface and its neighbor as vector information, translate the received movement information into vector information; and map the vector information translated from the received movement information to the vector information expressing the orientation of the at least one element and at least one neighbor. The storage configured to store the vector information.

DETAILED DESCRIPTION

The methodologies, systems and teachings disclosed herein can be embodied in an electronic device that is capable of receiving commands from a pointer-based control device to navigate an on-screen user interface. Examples of such electronic devices include, but are not limited to: personal computers, set-top boxes, televisions, media players, gaming devices, test equipment, and the like.

Figure 1A:
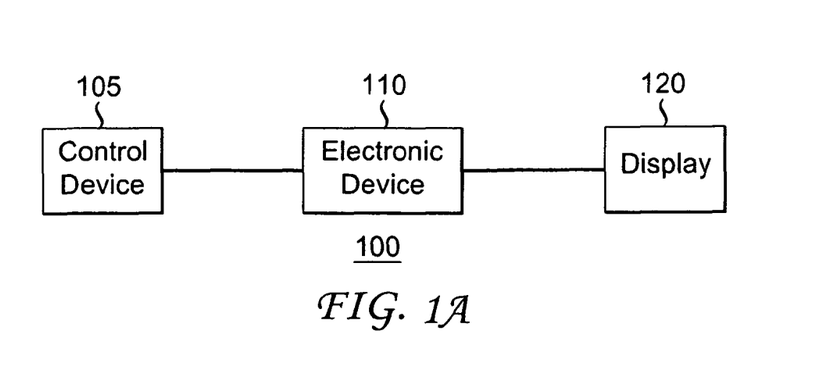
FIG. 1A is a diagram depicting an embodiment of a system having separate components in accordance with one embodiment.

FIG. 1A depicts one system 100 in which the functionality described herein can be employed. In this example there are three main components: a control device 105, the electronic device 110, and a display 120. In this embodiment, the media player 110 is a set top box, such as a media player or a personal computer that is designed to be connected to a control device 105 and a display 120. The control device is a pointer-based control device such as a mouse, trackball, touch-pad, or gyroscopic remote. The control device 105 is connected to the electronic device 110 thru a wired connection, such as a USB or network cable, or a wireless connection such as: Infrared (IR), Radio Frequency (RF), Bluetooth (BT), or wireless networking protocol (WiFi). The display 120 can be any display capable of displaying a user interface such as a Cathode Ray Tube (CRT), Plasma, Liquid Crystal Display (LCD), Organic Light Emitting Diode (OLED), or the like. The connection between the electronic device 110 and the display 120 can be a coaxial, RCA, VGA, DisplayPort, DVI, HDMI or other type of connection.

Figure 1B:
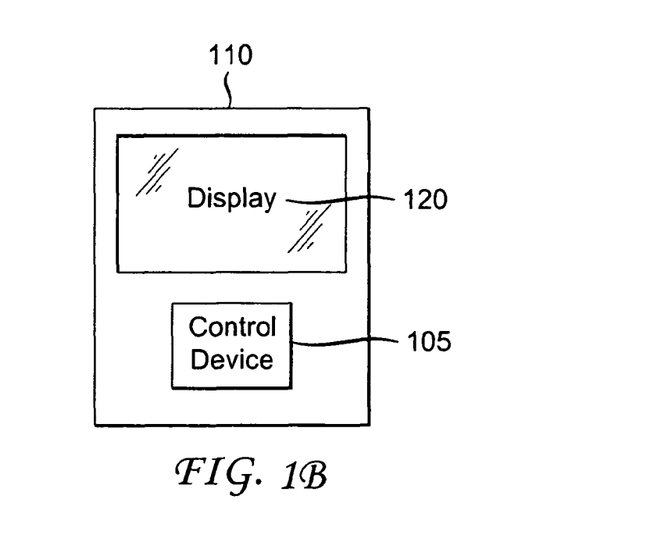
FIG. 1B is a diagram depicting an embodiment of a system wherein the different components are incorporated into one unit in accordance with one embodiment.

While in the embodiment of FIG. 1A the control device 105, electronic device, and display 110 are depicted as separate devices, in many embodiments, one or more of these components may be combined. An example of this can be seen I FIG. 1B. FIG. 1B depicts an electronic device 110 that includes the control device 105 and the display 120. Examples of such electronic devices include, but are not limited to: laptops, personal media players, ebook readers, personal gaming systems, test equipment, and the like.

Figure 2:
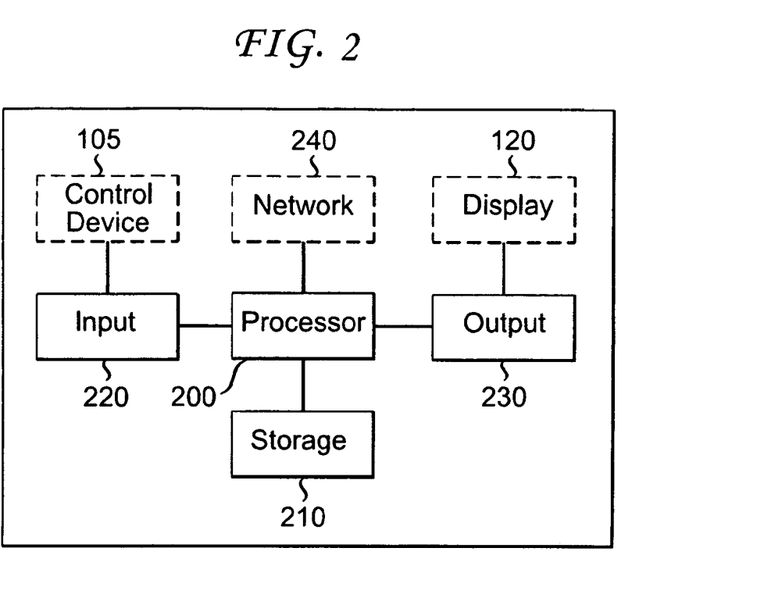
FIG. 2 is a block diagram depicting the elements of a system in accordance with one embodiment.

FIG. 2 is a block diagram depicting the elements of electronic device 110 in accordance with one embodiment. In this embodiment, the media player 110 comprises a processor 200, storage 210, input interface 220, and an output interface 230. In some embodiments, the consumer electronics device can further include an input interface 240 and a network interface 250. Each of these elements will be discussed in more detail below.

The processor 200 controls the operation of the electronic device 110. The processor 200 runs the software that operates the electronic 110 as well as provides the functionality of vector navigation. The processor 200 is connected to storage 210, input interface 220, and output interface 230, and, in some embodiments, network interface 240, and handles the transfer and processing of information between these elements. The processor 200 can be general processor or a processor dedicated for a specific functionality. In certain embodiments there can be multiple processors.

The storage 210 is where the software and other information used by the electronic device 110 are stored. The storage 210 can include volatile memory (RAM), non-volatile memory (EEPROM), magnetic media (hard drive), optical media (CD/DVD-Rom), or flash based storage. In certain embodiments the storage 210 will typically include memory as well as large capacity storage such as a hard-drive.

The input interface 220 allows the user to interact with the electronic device 110. The input interface 220 handles the interfacing with the various devices that can be used to input information, such as the control device 105.

The output interface 230 is configured to provide the media in the correct format for outputting on the display 120. The proper format can include the codec for the content to be output as well as the connector type used to connect to an external video display device or audio device or in some embodiments, the onboard display or speakers. The output interface 230 can also provide the graphics and menus that are navigated using the disclose vector navigation functionality.

In certain other embodiments the electronic device 110 may also include the control device 105 and display 120 such as depicted in FIG. 1B. In the example shown in FIG. 2, the control device 105 is connected to the input interface 220 and the display 120 is connected to the output interface 230.

In certain other embodiments the electronic device 110 also includes a network interface 240. The network interface 240 handles the communication of the electronic device 110 with other devices over a network. Examples of suitable networks include Ethernet or multimedia over coaxial (MoCa) networks. Other types of suitable home networks will be apparent to one skilled in the art given the benefit of this disclosure.

It should be understood that the elements set forth in FIG. 2 are illustrative. The electronic device 110 can include any number of elements and certain elements can provide part or all of the functionality of other elements. For example, the much of the functionality of the input interface 220 and output interface 230 can be performed by the processor 200 or multiple general or dedicated processors. Likewise, network connectively can be implemented separate from either the output interface 230 or the input interface 220. Other possible implementation will be apparent to on skilled in the art given the benefit of this disclosure.

Figure 3:
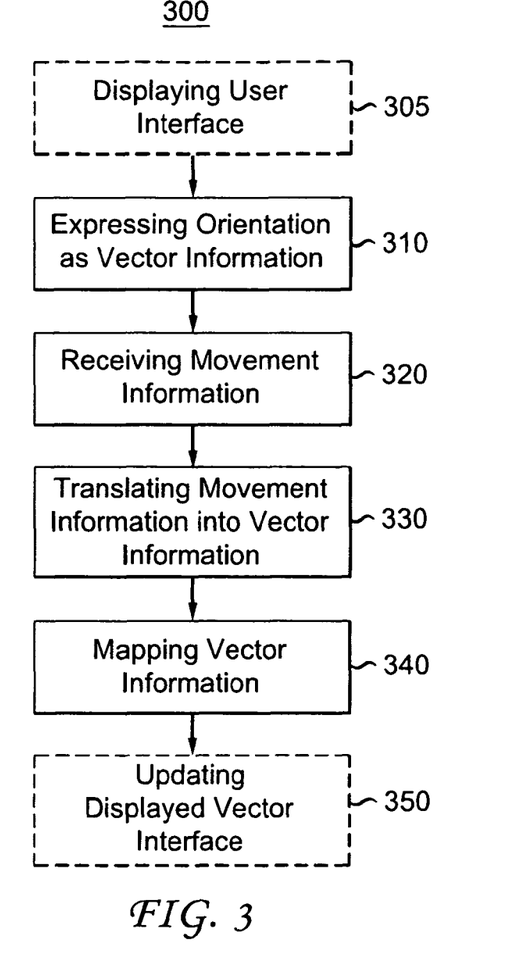
FIG. 3 is a flow diagram illustrating a methodology in accordance with one embodiment.

FIG. 3 is a flow diagram depicting a method 300 for the navigation of a user interface using vector navigation. At its most basic, the method involves four steps. The first step is expressing the orientation of at least one element of the user interface and at least one neighbor as vector information (step 310). Movement information input for navigating the user interface is then received (step 320). The movement information is translated into vector information (step 330). Finally, the vector information translated from the received movement information is mapped to the vector information expressing the orientation of the at least one element and at least one neighbor. In certain embodiments, the method can further include the steps of displaying the user interface (step 305) and updating the displayed user interface to reflect the received movement information mapped to the orientation of the at least one elements and at least one neighbor.(step 350). Each of these steps will be discussed in more detail below.

The displaying of a user interface (step 305) involves the processor 200 generating the user interface, the output interface 230 outputting the user interface to a display 120 on which the user interface is displayed. In one embodiment, the user interface is a graphical user interface of designed to be navigated using a Direction pad (D-Pad) in an orthogonal manner (up/down/left/right). Examples of such a user interfaces, but are not limited to, electronic program guides (EPGs), settings and configuration menus, on-screen keyboards, or the like. In such displays, an active element of the interface is usually highlighted to indicate the active status of the element and to give a reference position to a user for navigating the user interface. Traditionally, a user would use the D-pad to give an up/down/left/right command input to change the active element to a neighboring element that is above, below, to the left of, or the right of the previous active element. The methods and teaching disclosed herein allow a user to navigate t this type of user interface using a pointer-based based control device instead of a D-pad without requiring an on-screen pointer indicator but instead uses the highlighted active element indicator described above.

Vector navigation is used to achieve this. With vector navigation, the orientation of the elements and their neighbors in the user interface are expressed as vector information (step 310). An example of this can be seen in FIG. 4.

Figure 4:
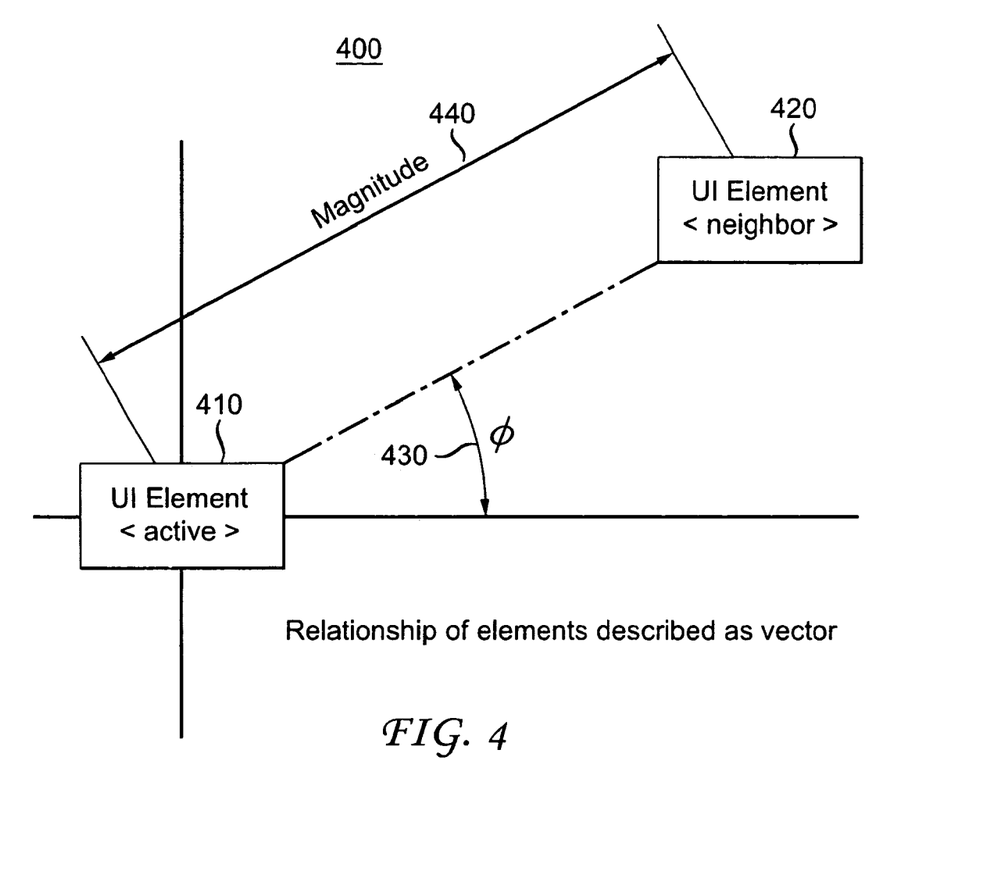
FIG. 4 is a graphical representation of the vector information used to express the orientation of an element and its' neighbor in accordance with an embodiment.

FIG. 4 is a graphical representation 400 of the vector information used to express the orientation of an element 410 and its, neighbor 420. In this example, the user interface element 410 is the active element in the user interface. The vector information 400 expressing, defining, or otherwise describing the orientation and relationship of the active element 410 with the neighbor element includes angle (θ) 430 and magnitude 440 components. In a similar fashion, the orientation and relationship of other neighbors can also be expressed, defined, or otherwise described with vector information. An example of this can be seen in FIG. 5.

Figure 5:
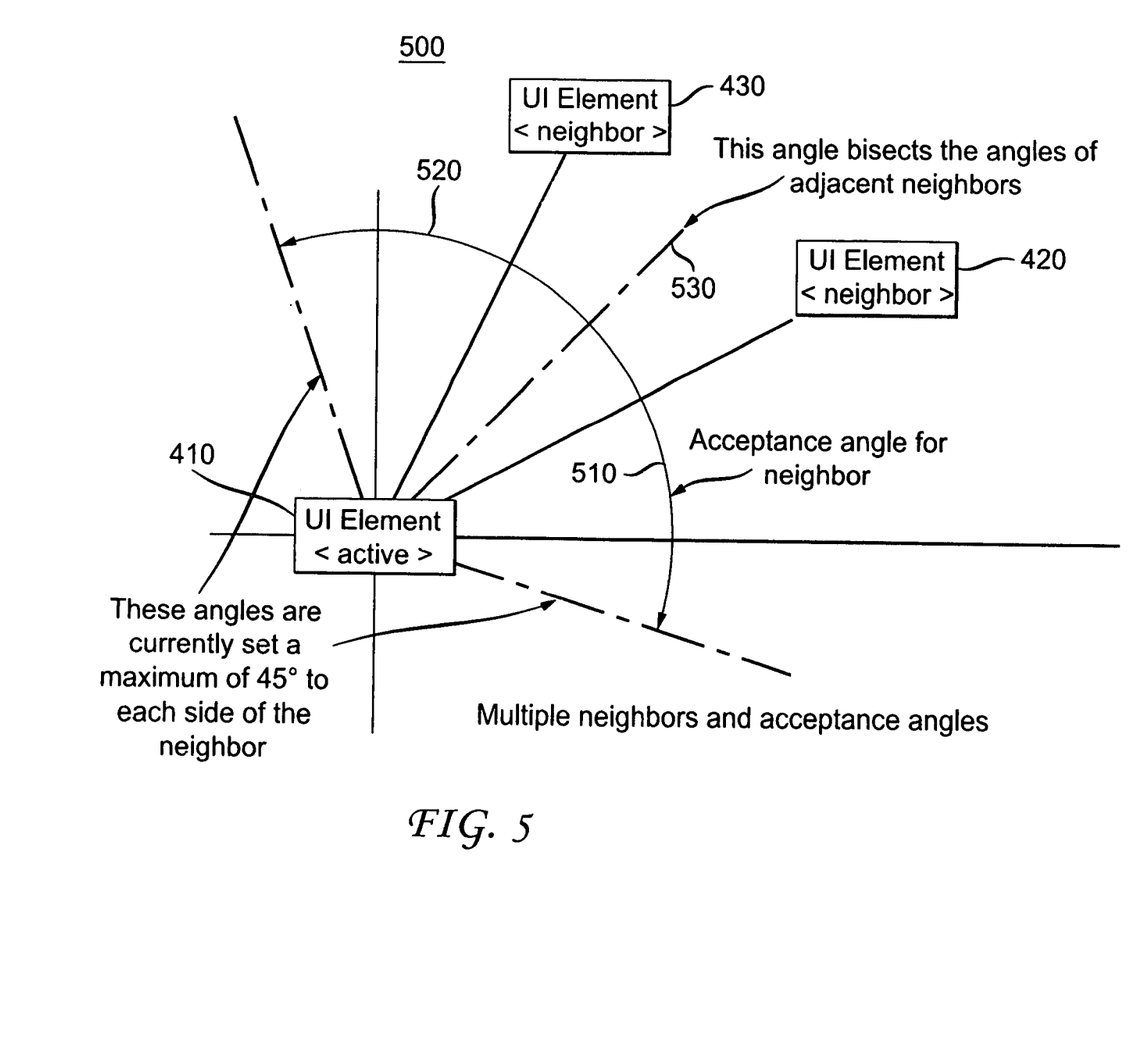
FIG. 5 is a graphical representation of the vector information used to express the orientation of an element and multiple neighbors in accordance with an embodiment.

FIG. 5 is a graphical representation 500 of the vector information used to express the orientation of an element 410 and multiple neighbors 420, 430. To increase the robustness of the system in differentiating and selecting between multiple neighbors 420, 430 acceptance angles 510, 520 can be used. The acceptance angles 510, 502 provide a "window" for acceptable commands that would select or change to a particular neighbor. For example, in FIG. 5, there are two neighbors 420 and 430. The dash-dot (-.-) line 530 delineates the angle bisecting the neighbors 420 and 430. The arc 510 below line 530 indicates the acceptance angle for neighbor 420 while the arc 520 above line 530 indicates the acceptance angle for neighbor 430. In the example of FIG. 5, the acceptance angles 510 and 520 are set to 45° from bisecting angle 530. Thus, if a received command has vector information including an angle that falls within the 45° acceptance angle indicated by arc 510, then neighbor 420 would be selected and made the new active element. If, however, a received command has vector information including an angle that falls within the 45° acceptance angle indicated by arc 520, then neighbor 430 would be selected and made the new active element.

Figure 6:
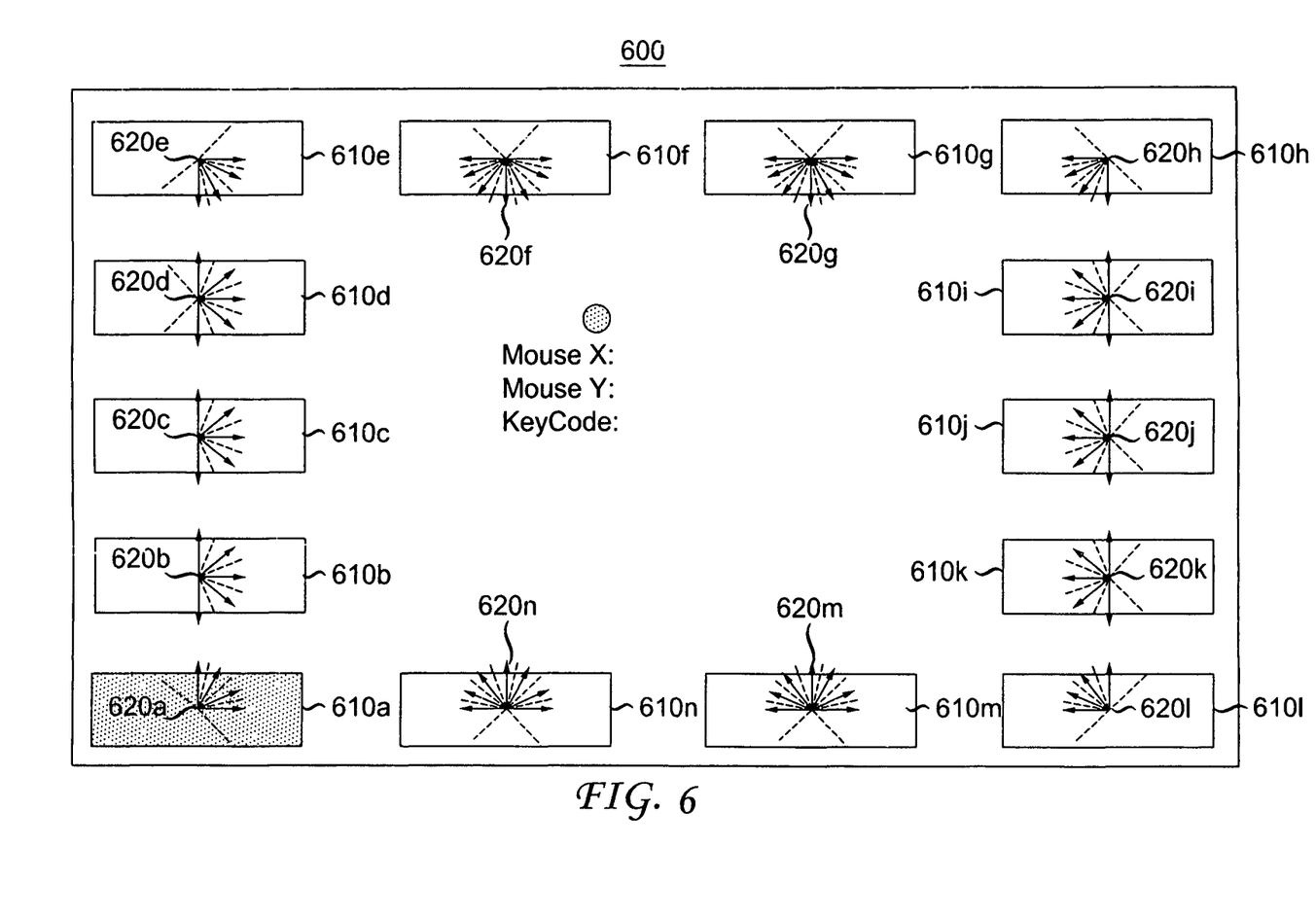
FIG. 6 depicts a representation how the orientation of elements and their neighbors can be expressed with vector information for a user interface in accordance with an embodiment.
Figure 7:
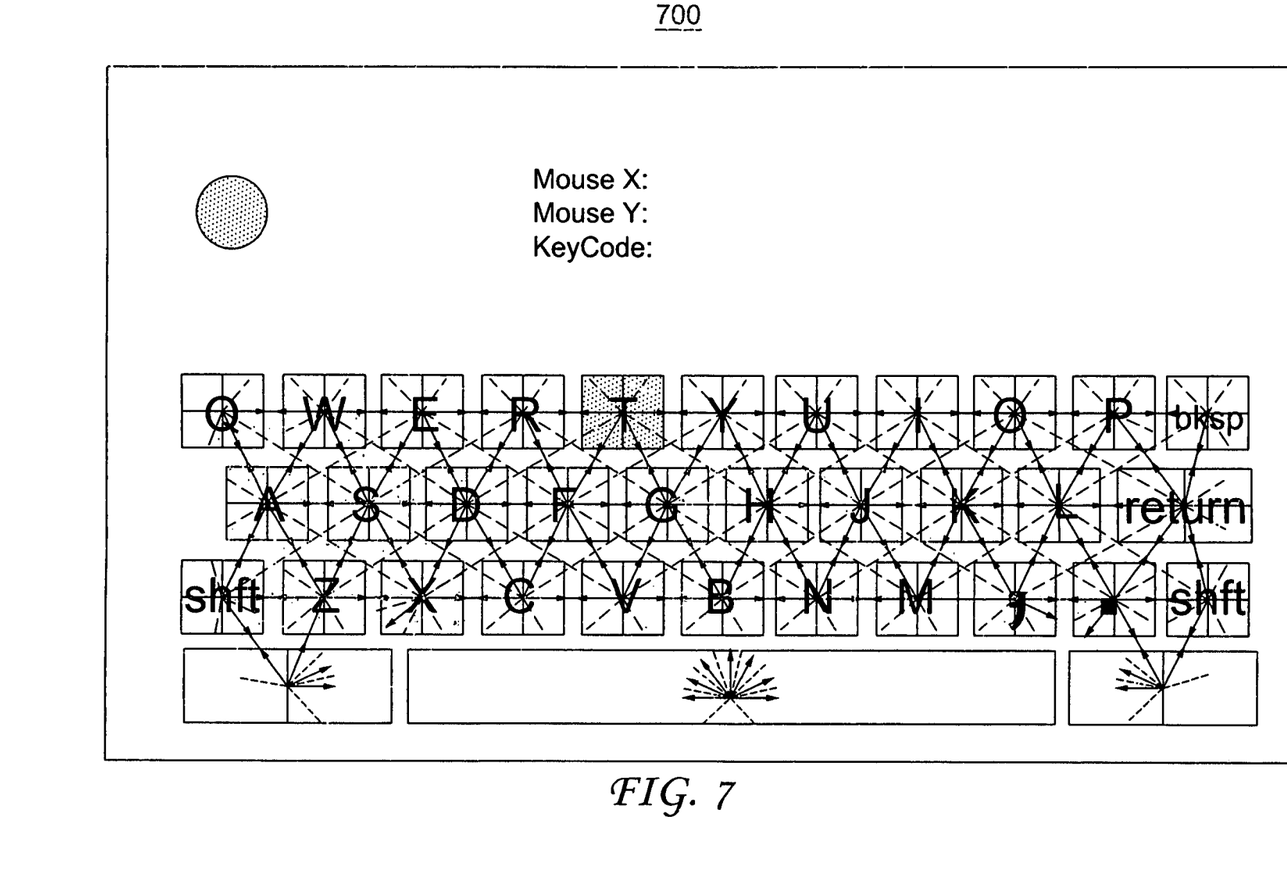
FIG. 7 depicts another representation how the orientation of elements and their neighbors can be expressed with vector information for a user interface in accordance with an embodiment.

Additional examples of how the orientation of elements and their neighbors can be expressed with vector information for a user interface can be seen in FIGS. 6 and 7.

In FIG. 6 the elements are positioned around the periphery of the user interface 600 as the elements might be arranged in a menu screen. In this example, element 610a is highlighted indicating that it is the active element. Superimposed on top of each element 610a-610n are depictions of the vector relationship 620a-620n to the other neighboring elements indicated by arrows (→) with acceptance angels indicated by dotted ( . . . ) and dashed ( - - - ) lines.

In FIG. 7 the elements are positioned in on-screen keyboard in user interface 700. In this example, the element representing the "T" key is highlighted indicating that it is the active element. Superimposed on top of each element (keys) are depictions of the vector relationship to the other neighboring elements (keys) indicated by dotted ( . . . ) and dashed ( - - - ) lines.

In a similar manner, magnitude threshold information (not shown) may also be used. That is, a threshold value for the magnitude component of the vector information is set. This value is the minimum (or maximum or both) value that must be met to select a particular neighbor. This eliminates selection of neighbors cause by unintentional, accidental, incidental, or inadvertent input provided by a pointer-based control device. This also allows for discrimination for selection between multiple neighbors that have orientation or location along the same vector angle from the active element.

Referring back to FIG. 3, movement information input for navigating the user interface is received (step 320) and translated into vector information (step 330) including angle and magnitude components as discussed above in regard to FIG. 4. As discussed above in regard to FIGS. 1A, 1B, and 2 the movement information is received from a control device. In accordance with one embodiment the control device is a pointer-based control device such as a mouse, trackball, or touch-pad. Traditionally, such pointer based control devices provide vertical and horizontal movement information (e.g. direction, distance, and velocity) which are translated into the movement of the pointer on the screen. Using the techniques disclosed herein this movement information is translated in the vector information (angle and magnitude) similar to as discussed above using known techniques.

Once the movement input information is translated into vector information it can be mapped to the vector information expressing the orientation of the active element and it neighbor(s) (step 340). An example of this can be seen in FIG. 8.

Figure 8:
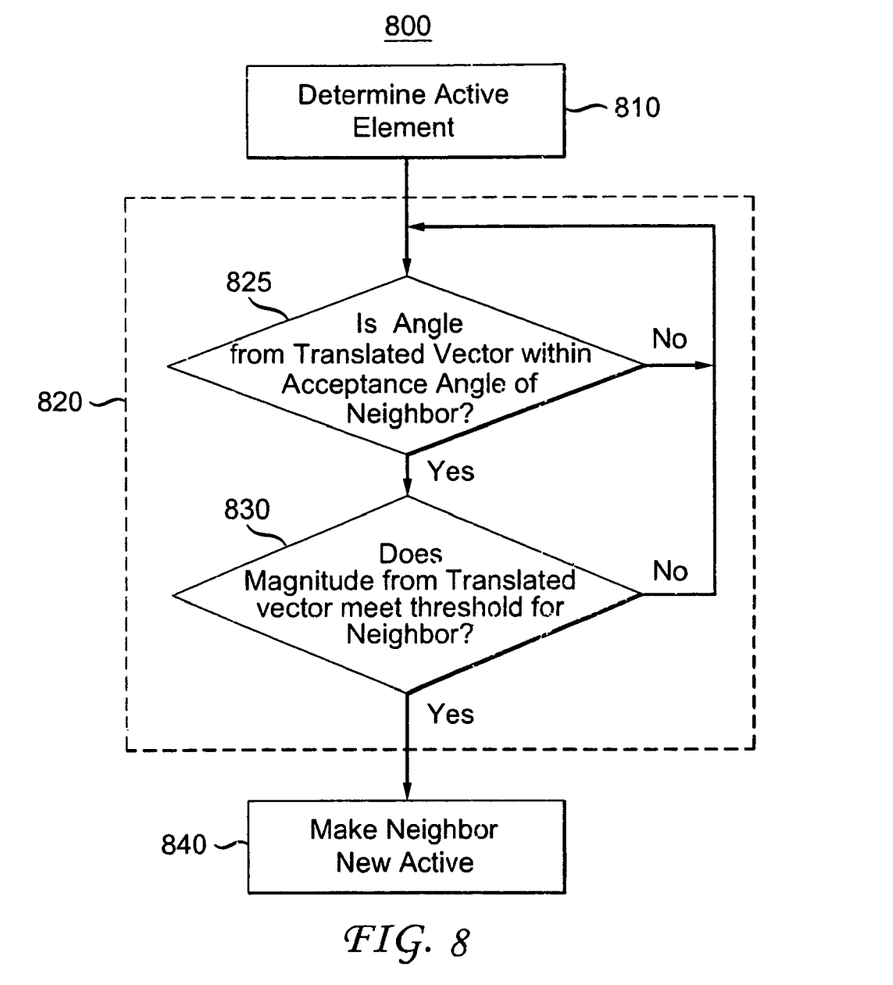
FIG. 8 is a flow diagram illustrating a methodology in accordance with one embodiment.

FIG. 8 depicts a flow chart 800 for one embodiment of mapping the translated vector information to the vector information expressing the orientation of the active element and it neighbor(s). The first step is determining the active element (step 810). The translated vector information is then compared to vector information expressing the orientation of one or more neighbors of the active element (step 820). If the criteria for the neighbor are met, then the neighbor is then made the new active element (step 840). Each of these steps will be discussed in more detail below.

In determining the active element (step 810) a reference point for navigating to other element is established. For example, in FIGS. 5-7 each element has related vector information defining its orientation/relationship to its neighbors. Thus, in order to know what element to move to, the element being moved from must be known.

Once the active element is established (step 810), the translated vector information can be compared to the vector information expressing the orientation of the active element and it neighbor(s) (step 820). In the example of FIG. 8, this involves determining if the angle of the translated vector information is within the acceptance angle of the neighbor (step 825) and if the magnitude of the translated vector meets the magnitude threshold of the neighbor (step 830). In certain embodiments, this process can be repeated for multiple neighbors until the neighbor meeting the criteria is found.

If the vector information criteria for the neighbor are met then the neighbor is made the new active element (step 840). This can be reflected in the displayed user interface by highlighting or otherwise indicating the new active element (step 350 of FIG. 3). This process may then be repeated for every new movement command received. An example of how this might work can be seen in FIG. 9.

Figure 9:
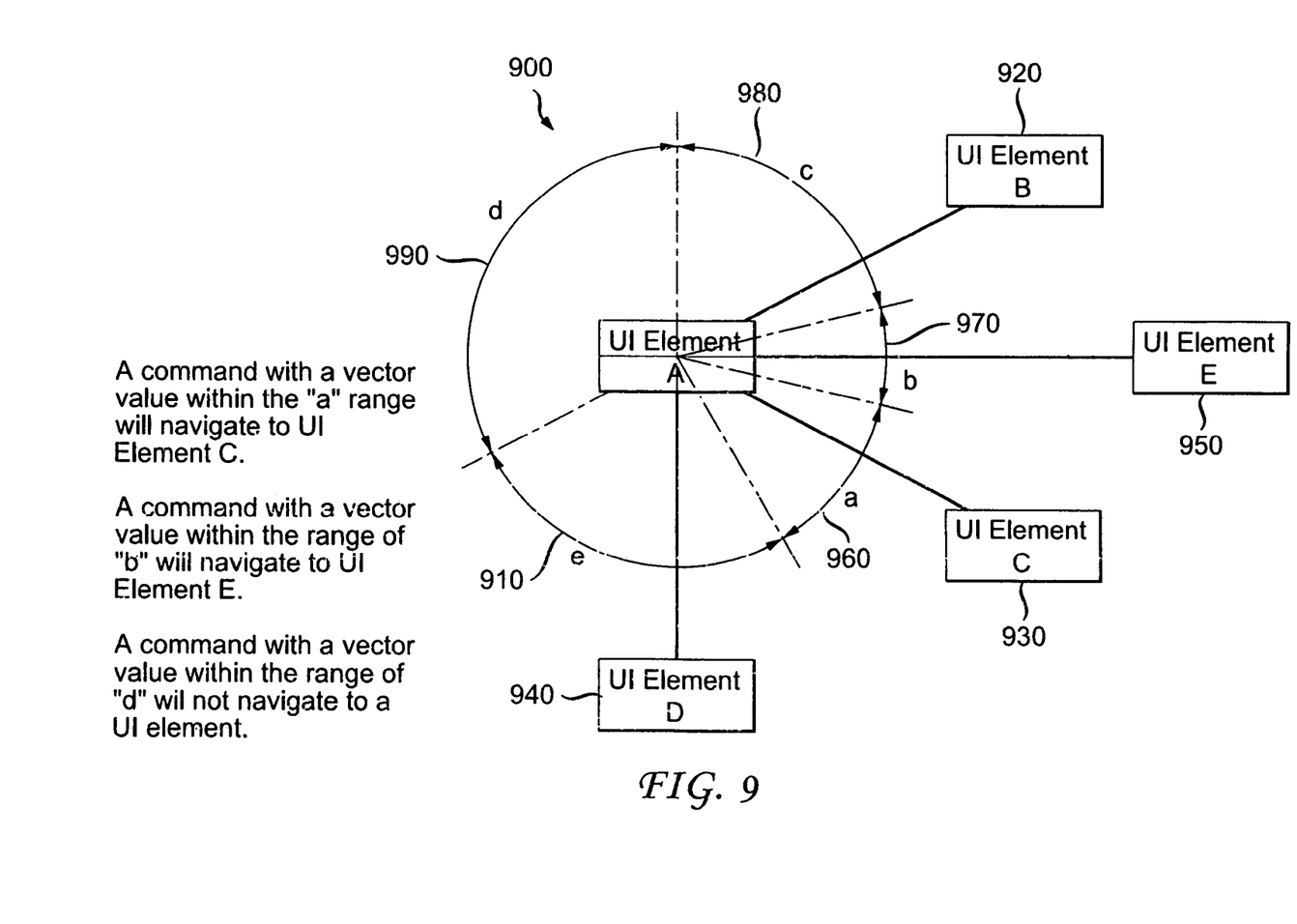
FIG. 9 is a graphical representation of how the vector information used to express the orientation of an element and multiple neighbors is used to navigate between different elements in accordance with an embodiment.

FIG. 9 is a graphical representation 900 of the vector information used to express the orientation of an element 910 and multiple neighbors 920, 930, 940, and 950. In this example only the angle component is being evaluated and it is assumed that the magnitude of the translated vector information of the received move command meets the magnitude threshold requirements. Here, if the angle value for the translated vector information is within acceptance angle "a" range 960, then element "C" 930 will be navigated to and become the new active element. If the angle value for the translated vector information is within acceptance angle "b" range 970, then element "E" 950 will be navigated to and become the new active element. If the angle value for the translated vector information is within acceptance angle "c" range 980, then element "B" 920 will be navigated to and become the new active element. If the angle value for the translated vector information is within acceptance angle "d" range 990, then no element will be navigated to and element "A" will remain the active element. If the angle value for the translated vector information is within acceptance angle "e" range 1000, then element "D" 940 will be navigated to and become the new active element.

While the example set forth above has focused on an electronic device, it should be understood that the present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Additionally, the description above is intended by way of example only and is not intended to limit the present invention in any way, except as set forth in the following claims.

The invention claimed is:

1. A method for navigating a user interface comprising:
   determining an active element in the user interface;
   expressing an orientation of the active element of the user interface and a neighbor element as orientation vector information comprising an acceptance angle and an orientation magnitude;
   receiving a movement information input for navigating the user interface;
   translating the movement information input into translated vector information including an angle component and a magnitude component;
   and
   making the neighbor element a new active element when the angle component of the translated vector information is within the acceptance angle and the magnitude component of the translated vector information meets the orientation magnitude of the neighbor element and is between a minimum magnitude and a maximum magnitude.

2. The method of claim 1, further comprising:
   displaying a user interface comprising multiple elements for a user to navigate between.

3. The method of claim 1, wherein the movement information input is received from a pointer-based control device.

4. The method of claim 1, wherein the orientation of multiple elements and their neighbors are expressed.

5. A system allowing for the navigation of a user interface including an electronic device comprising:
   an output interface configured to output a user interface;
   an input interface configured to receive movement information for navigating the user interface;
   a processor configured to:
      determine an active element in the user interface;
      express an orientation of the active element of the user interface and a neighbor element as orientation vector information comprising an acceptance angle and an orientation magnitude;
      receive a movement information input for navigating the user interface;
      translate the received movement information input into translated vector information including an angle component and a magnitude component;
      map the translated vector information to the orientation vector information to make the neighbor element a new active element when the angle component of the translated vector information is within the acceptance angle and the magnitude component of the translated vector information meets the orientation magnitude of the neighbor element and is between a minimum magnitude and a maximum magnitude.

6. The system of claim 5, further comprising a display for displaying the user interface outputted by the output interface.

7. The system of claim 6, wherein the display is part of the electronic device.

8. The system of claim 5, further comprising a control device configured to generate the movement information to be received by the input interface.

9. The system of claim 8, wherein the control device is part of the electronic device.

10. The system of claim 5, wherein the orientation of multiple elements and their neighbors are expressed.

11. A computer program product comprising a non-transitory computer useable medium having a computer readable program, wherein the computer readable program when executed on a computer causes the computer to perform a method including:
    determining an active element in a user interface;
    expressing an orientation of the active element of the user interface and a neighbor element as orientation vector information comprising an acceptance angle and an orientation magnitude;
    receiving a movement information input for navigating the user interface;
    translating the movement information input into translated vector information including an angle component and a magnitude component;
    and making the neighbor element a new active element when the angle component of the translated vector information is within the acceptance angle and the magnitude component of the translated vector information meets the orientation magnitude of the neighbor element and is between a minimum magnitude and a maximum magnitude.

12. The computer program product of claim 11, further comprising:
    displaying a user interface comprising multiple elements for a user to navigate between.

13. The computer program product of claim 11, wherein the movement information input is received from a pointer-based control device.

14. The computer program product of claim 11, wherein the orientation of multiple elements and their neighbors are expressed.

* * * * *